No. 760,040. PATENTED MAY 17, 1904.
R. TATUM.
ATTACHMENT FOR EYEGLASS LENSES.
APPLICATION FILED JULY 8, 1903.
NO MODEL.
Fig. 1.
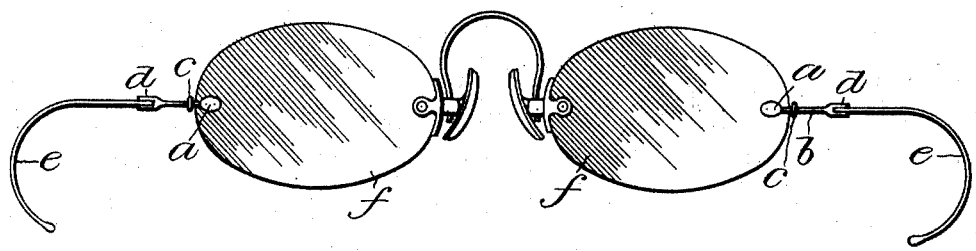
Fig. 2.
Fig. 3. Fig. 4.
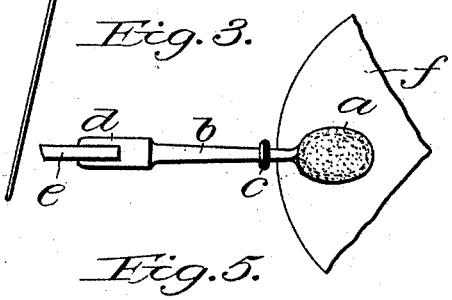 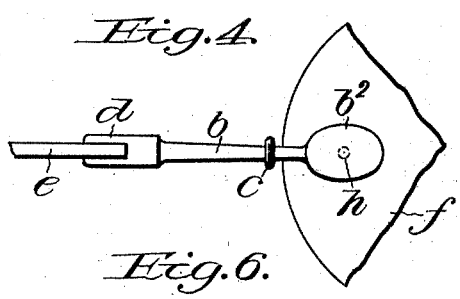
Fig. 5. Fig. 6.
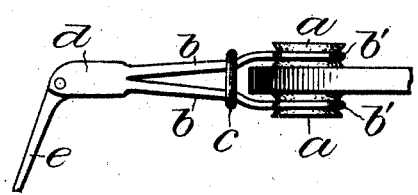 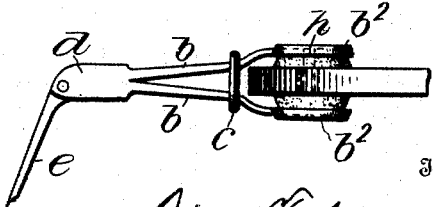
Witnesses
C. N. Walker
J. H. Joseph Doyle
Inventor
Rives Tatum
By Wright, Brown & Quinby
Attorneys
THE NORRIS PETERS CO., PHOTO-LITHO., WASHINGTON, D. C.

No. 760,040. Patented May 17, 1904.

UNITED STATES PATENT OFFICE.

RIVES TATUM, OF BOSTON, MASSACHUSETTS.

ATTACHMENT FOR EYEGLASS-LENSES.

SPECIFICATION forming part of Letters Patent No. 760,040, dated May 17, 1904.

Application filed July 8, 1903. Serial No. 164,748. (No model.)

*To all whom it may concern:*

Be it known that I, RIVES TATUM, of Boston, in the county of Suffolk and State of Massachusetts, have invented certain new and useful Improvements in Attachments for Eyeglass-Lenses, of which the following is a specification.

This invention has for its object to provide a simple and effective attachment formed as an arm to detachably grasp an eyeglass-lens, the said arm serving either as a means for connecting a bow or temple piece with the lens or as a shank or handle to be grasped by the thumb and finger or to receive a supporting-cord.

The invention consists in the improvements which I will now proceed to describe and claim.

Of the accompanying drawings, forming a part of this specification, Figure 1 represents a side view of a pair of eyeglasses with bows attached thereto in accordance with my invention. Fig. 2 represents an edge view of the glasses and bows shown in Fig. 1. Figs. 3 and 4 represent enlarged detail views illustrating my invention. Figs. 5 and 6 represent edge views of the constructions shown in Figs. 3 and 4.

The same letters of reference indicate the same parts in all the figures.

In the drawings, $f\,f$ represent the lenses of a pair of eyeglasses, the same being connected in the usual or any suitable manner. In carrying out my invention I provide an attachment for each or either of the lenses, said attachment comprising a forked arm having two branches or members $b\,b$, which are connected at their inner ends, as shown at $d$, their outer ends being free, so that they may be moved toward and from each other. Each branch $b$ is provided at its free end with a socket or holder $b'$, with which is engaged a pad or jaw $a$, composed of yielding material and preferably of elastic material, such as rubber. In Figs. 3 and 5 I show the holder $b'$ formed as loops or jaws adapted to encircle the pads or jaws $a$, the latter being contracted between their inner and outer surfaces to engage the said holders. In Figs. 4 and 5 the holders are formed as flat plates $b^2$, having marginal flanges which embrace the backs of the pads or jaws $a$. In either case the pads or jaws are detachably engaged with the holders, the compressibility of the pads or jaws enabling them to be withdrawn from the holders, so that new ones may be substituted. When the pads or jaws are composed of rubber, their elasticity enables them to spring outwardly into engagement with the confining portions of the holders. Means are provided for adjusting and holding the branches $b\,b$ in position to cause the jaws to grasp a lens interposed between them. As here shown, the jaws are adjusted and held by means of a sliding ring or loop $c$, which is movable upon the normally diverging or inclined portions of the branches $b$, and when moved outwardly toward the free ends of the branches acts in said inclined portions to force the branches and jaws inwardly and will be frictionally held in such adjusted position. It will be seen that the ring $c$ and the inclined portions of the branches enable the jaws to conform to the thickness of the lens, so that a lens of any thickness may be grasped by the jaws. It is obvious that any other suitable means may be employed for adjusting the branches to cause the jaws to grasp the lens and for holding the branches in their adjusted position. The forked arms above described may be adapted to serve as a handle to be grasped by the thumb and finger or to receive a cord, in which case only one of the lenses would require the above-described attachment. In the drawings I have shown the forked arm engaged with a bow or temple piece $e$, which is pivotally connected to the outer portion of the forked arm. Each lens is therefore provided with one of the described attachments, each attachment having a bow $e$.

The pads or jaws $a$, especially when made of rubber, may be formed so that their outer faces, which bear upon the lenses, will closely fit the surfaces of the lenses, so that air will be excluded from between the jaws and the lenses, the jaws being therefore held in place in part by atmospheric pressure. To this end the faces of the jaws which bear upon the lenses may be cupped or concave.

In Fig. 6 I show one of the holders $b^2$ provided with a pin or stud $h$, which projects into an orifice formed for its reception in the lens

*f*, the engagement of the pin with the lens preventing any possibility of the removal of the attachment from the lens by the slipping of the jaws.

I claim—

1. An attachment for eyeglass-lenses comprising a forked arm, the branches of which are provided with jaw-encircling holders, elastic jaws inserted in said holders and removably held therein by their own resilience, said jaws having faces formed to bear on the opposite sides of a lens, and means for adjusting and holding the branches in position to cause the jaws to grasp a lens interposed between them.

2. An attachment for eyeglass-lenses comprising a forked arm the branches of which are formed as loops at their outer ends and provided with elastic jaws encircled by said loops, said branches having inclined portions, and a loop adapted to slide on said inclined portions to adjust and hold the branches and jaws.

3. An attachment for eyeglass-lenses comprising a forked arm the branches of which are provided with holders at their outer ends, jaws secured to said holders, one of the holders having a stud projecting below the jaw, and means for adjusting and holding the branches in position to cause the jaws to grasp a lens.

In testimony whereof I have affixed my signature in presence of two witnesses.

RIVES TATUM.

Witnesses:
  C. F. BROWN,
  A. W. HARRISON.